Patented Mar. 12, 1935

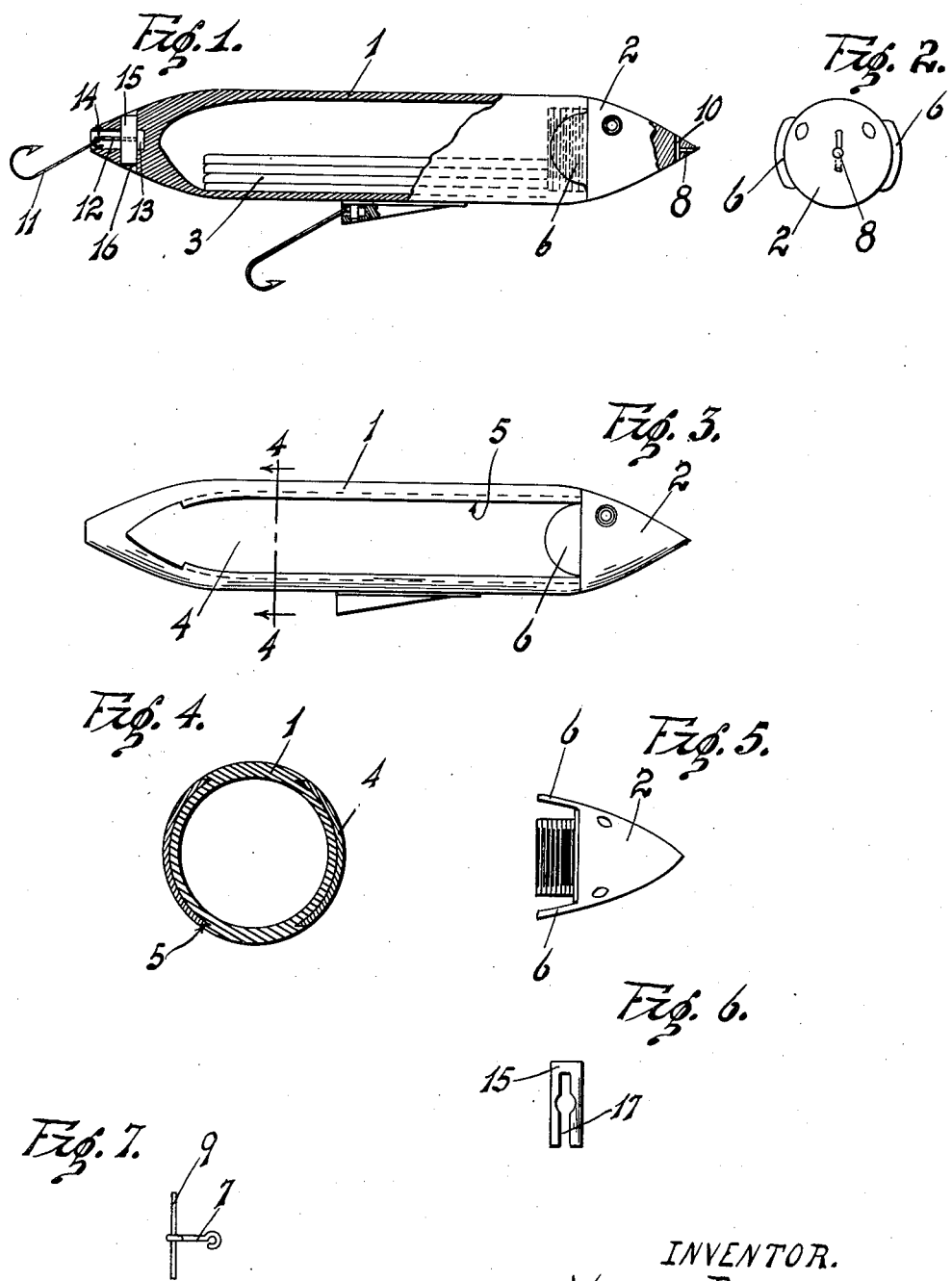

1,993,798

UNITED STATES PATENT OFFICE 1,993,798

ARTIFICIAL LURE

Walter Peterson, Long Beach, Calif.

Application August 25, 1933, Serial No. 686,710

6 Claims. (Cl. 43—46)

This invention relates to an artificial lure, the prime object of which is to provide a lure which can be used as a float, a sinker or for trolling purposes, at the will of the operator.

A feature of my invention resides in the method of varying the weight of the lure so that it can be used for trolling purposes at various depths, and also for casting.

An object of my invention is to provide a lure having detachable plates thereon so that various types of fish can be simulated.

Another object is to provide a novel means for securing the hooks to the body of the lure.

Other objects, advantages and features of invention may appear from the accompanying drawing, the subjoined detailed description and the appended claims.

In the drawing

Figure 1 is a side elevation of my lure with parts broken away to show interior construction.

Figure 2 is an end view of the same.

Figure 3 is a side elevation of my lure.

Figure 4 is an enlarged sectional view taken on line 4—4 of Fig. 3.

Figure 5 is a top plan view of the head.

Figure 6 is an enlarged side elevation of the locking key.

Figure 7 is a side elevation of the front ring.

Referring more particularly to the drawing, the numeral 1 indicates a hollow body which is preferably made of metal, altho any other suitable material may be employed. A head 2 screws into or onto the front end of the body 1 thereby closing and sealing the same. When it is desired to use the lure as a sinker, or for trolling purposes, weight strips 3 are placed in the body 1. As many of these weights are inserted therein, as are necessary, and it is evident that by this means the lure can be held at either a shallow or great depth, as desired. The head 2 is unscrewed from the body in order to place the weights therein. This is easily and quickly done, thus permitting the fisherman to vary the depth at which he is fishing.

On each side of the body 1, I provide an arcuate plate 4 which slides into longitudinal grooves 5 formed on the outside of the body. The grooves 5 preferably do not extend the full length of the plates 4 so that the said plates project beyond the rear end of the grooves. The purpose of this arrangement is to readily clear the grooves of sand or other material when a new plate is inserted.

The plates 4—4 are held in position at the forward end by rearwardly projecting lugs 6—6 on the head 2. These lugs simulate gills and also serve to hold the front end of the plates tightly against the body of the lure. The plates 4 are made in different colors or with different designs upon them, thus simulating different types of fish.

The lure is attached to the line by a ring 7 and this ring extends into a horizontal opening 8 in the head of the lure. A pin 9 extends thru a hole 10, intersecting the opening 8. The pin also extends thru the rear end of the ring 7, thus holding it securely in position. The fish hooks 11 on the body of the lure are held in position by hook pins 12. The hook of this last named pin engages the eye in the end of the fish hook 11, thereby holding said fish hook in position.

A head 13 is formed on the pin 12 and a horizontal bore 14 is formed in the rear end of the body 1 to receive the head 13.

A locking key 15 fits in a transverse bore 16 and closely fits the same. The key 15 is formed with a slot 17 which fits over the shank of the pin 12. The key 15 also presses against the head 13, and thus it will be evident that the pin 12 is securely held in position. However, the pin can be easily and quickly detached by removing the key 15. It is thus possible to easily replace or renew the fish hooks, if they are broken.

The variable weight of the lure is also very advantageous for casting purposes. Different weights are required when casting because of the weight of the line and the action of the reel. With my lure, this weight can be easily changed.

Having described my invention, I claim:

1. An artificial lure comprising a hollow body, removable weights in said body, a head member on one end of the body, means removably securing the head member to the body, side plates on the body, and means removably securing the side plates to the body.

2. An artificial lure comprising a body, a head screwed onto the body, side plates, said body having grooves therein to receive the side plates, means on the head engaging the side plates whereby said plates are pressed tightly against the body, said body being hollow, and removable weights within the body.

3. An artificial lure comprising a body, said body having a bore therein, a second bore intersecting the first named bore, a hook pin fitted in one of said bores, a head on the hook pin and a locking key extending into the other of said bores, said key fitting over the hook pin.

4. An artificial lure comprising a body, said body having a bore therein, a second bore intersecting the first named bore, a hook pin fitted in one of said bores, a head on the hook pin and a locking key extending into the other of said bores, said key fitting over the hook pin, said body being hollow, removable weights within the body, and a head member detachably secured to one end of the body whereby said body is sealed.

5. An artificial lure comprising a body, said body having a bore therein, a second bore intersecting the first named bore, a hook pin fitted in one of said bores, a head on the hook pin, a locking key extending into the other of said bores, said key fitting over the hook pin, side plates on the body, and means removably securing the side plates to the body.

6. An artificial lure comprising a body, a head screwed onto the body, a pair of side plates, said body having longitudinally extending grooves in the sides thereof to receive the side plates, and gill lugs on the head engaging the side plates at the forward end thereof, whereby said plates are pressed tightly against the body.

WALTER PETERSON.